United States Patent [19]

Duntz, Jr.

[11] 3,877,287

[45] Apr. 15, 1975

[54] LOW FLOW GAS OR LIQUID CALIBRATOR

[75] Inventor: John L. Duntz, Jr., Gulf Breeze, Fla.

[73] Assignee: The United States of America as represented by the Secretary of the Navy, Washington, D.C.

[22] Filed: Aug. 9, 1973

[21] Appl. No.: 387,090

Related U.S. Application Data

[63] Continuation of Ser. No. 229,052, Feb. 27, 1972, abandoned.

[52] U.S. Cl. ........................... 73/3; 73/194 E; 73/253
[51] Int. Cl. ............................................. G01f 25/00
[58] Field of Search ...................... 73/3, 194 E, 253; 250/231 R; 356/28

[56] References Cited
UNITED STATES PATENTS 3,098,382  7/1963  Hoffman et al. ...................... 73/3 X

| | | |
|---|---|---|
| 3,187,551 | 6/1965 | Hill .......................................... 73/3 |
| 3,391,569 | 7/1968 | Rieke et al. ............................... 73/3 |
| 3,425,262 | 2/1969 | Herzog ...................................... 73/3 |
| 3,517,308 | 6/1970 | Mirdadian ............................. 73/3 X |
| 3,673,851 | 7/1972 | Wright et al. ............................. 73/3 |

*Primary Examiner*—Richard C. Queisser
*Assistant Examiner*—Daniel M. Yasich
*Attorney, Agent, or Firm*—R. S. Sciascia; P. Schneider; R. Rothman

[57] ABSTRACT

An apparatus for calibrating liquid or gas flowmeters using a piston driven at a constant velocity to produce a constant flow rate through a precision bored tube. The system flow rate is determined by measuring the time required to transmit a given volume, or the velocity of the motor which drives the piston pump. This system is capable of using gas or liquid medium and has a low flow rate limit of .0012cc/min with an accuracy of .38 percent.

11 Claims, 7 Drawing Figures

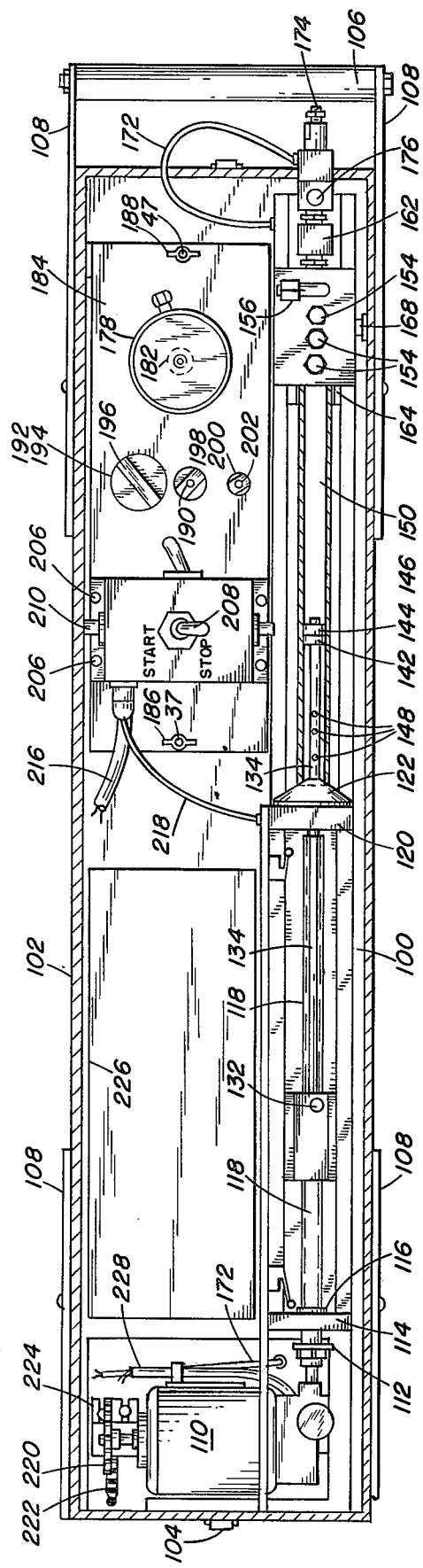
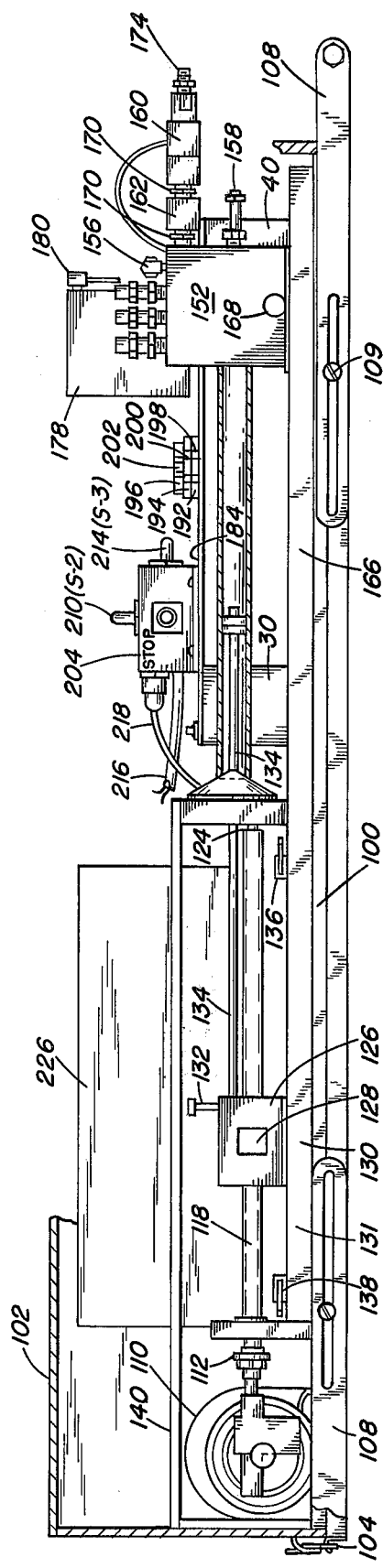

LOW FLOW GAS OR LIQUID CALIBRATOR

This is a continuation, of application Ser. No. 229,052 filed Feb. 24, 1972, now abandoned.

BACKGROUND OF THE INVENTION

A. Field of the invention

The present invention relates generally to flowmeter calibrators and more particularly to low flow rate calibrators.

B. Description of the prior art.

The most common technique for flowmeter calibration involves the propelling of a solid object, such as a scraper, a spheriod or a plug, through a given section of conduit by the fluid through said conduit. The operation of the flowmeters is started and stopped by the passage of the slug from a first predetermined point along said conduit to a second predetermined point along said conduit. The measurement of the to be calibrated flowmeter is then compared with a known proven flowmeter. The major problem of this type of system is the inconvenience caused by the necessity of repositioning the slug from the point in the conduit where it comes to rest to a point up stream where it can be used to initiate another calibration. The various solutions have involved intricate and cumbersome conduit arrangements.

Though this method is generally used in volume meter calibration, it is equally applicable to flowmeters which measure the rate of flow. Generally, flowmeters which measure the rate of flow of a gas or liquid medium register a value which is dependent upon the viscosity of the flowing medium. Since viscosity is a function of parameters, such as pressure, temperature, etc., it is necessary to recalibrate the flowmeter with each change of viscosity. This is a time consuming procedure which requires the removal of the to be calibrated flowmeter from the flow system.

Though there are many accurate flow rate calibration systems on the market, there are none which offer the accuracy that is required in the low flow rate region. The rule of thumb used in calibration is that a calibration standard instrument should be at least 10 times the accuracy of the instrument to be calibrated. A review of the flow measuring equipment available to date indicates a lack of such accuracy, a limitation of flow ranges, a limitation to gas or liquid, or a combination of these limitations. Thus one of the most critical problems has been a calibration system which can use a gas or liquid medium, and has the required accuracy at the low flow rates.

SUMMARY OF THE INVENTION

The present system is a flowmeter using a geared variable speed drive to drive therefor a micrometer screw which causes a shaft to move a piston down a precision bored tube thereby discharging a volume of gas or liquid. By means of directly located holes in the shaft a photocell arrangement starts and stops a counting device. The resultant known discharged volume and time allow the determination of flow rate. In addition, a light wheel and photocell arrangement allows, by correct setting of a counter gate time, the direct visual display of flow rate. The calibrator is capable of accepting various size tube/piston combination to allow different ranges of operation from 0.0012 to 280 cc/min. Facilities are supplied at the discharge end of the unit for the measurement of discharge temperature and pressure, the venting of tubes for liquid flow application and the closed loop operation in liquid mode.

OBJECTS OF THE INVENTION

An object of the present invention is to provide a calibrator with a flow rate as low as .0012 cc/min.

Another object is to provide a low flow rate which will handle gas or liquid medium with an accuracy of .38 percent.

A further object of the invention is the portability of the system.

Still another object is to provide a constant flow rate by the use of a motor driven piston.

A still further object of the invention is to provide a low flow rate calibrator with optimum accuracy which is reasonably inexpensive.

Other objects, advantages, and novel features of the present invention will become apparent from the following detailed description of the invention when considered in conjunction with the accompanying drawings.

BRIEF DESCRIPTION OF THE DRAWINGS

FIG. 1 is the side view of the preferred embodiment in its traveling mode.

FIG. 2 is the top view of the preferred embodiment in its traveling mode.

DESCRIPTION OF THE PREFERRED EMBODIMENT

Figure 3:
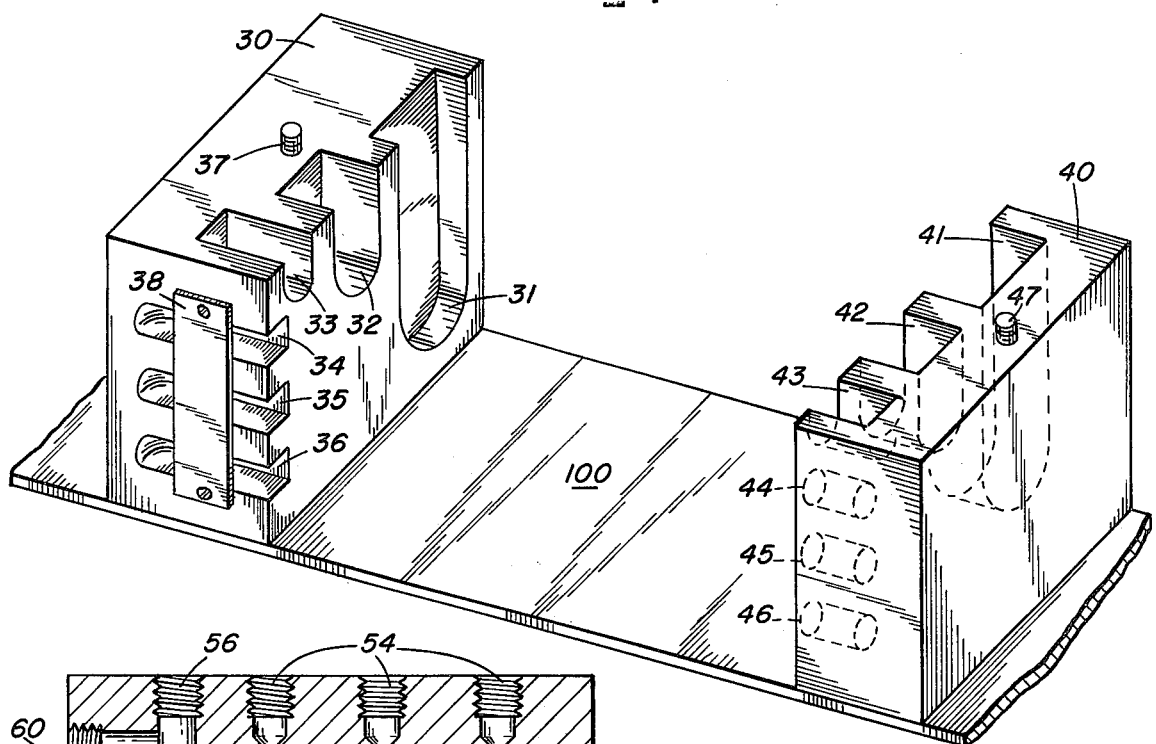
FIG. 3 depicts the tube and piston rod storage racks.

FIGS. 1 and a which illustrate the preferred embodiment of the flowmeter calibrator, show the entire assembly mounted on the base 100. When being transported or during idle periods, all integral pieces of equipment can be stored on the base and covered with plastic dust cover 102, which is fastened at both ends to base plate 100 by securing latches 104. The major components of the assembly are the drive assembly, tube assembly, measurement sensors, and peripheral equipment.

The drive assembly consist of the drive motor 110 and the motor and solenoid valves control unit 226, which controls the drive motor. The drive motor, with integral 6:1 gear reduction, drives micrometer screw 118 through a constant speed universal coupling 112. The microscrew, which rides on ball bearing 116 in support 114 and on needle bearing 24, drives slider 128 mounted in a slide base 130 along slide guide 131. One revolution of the output of the drive motor's gear reduction moves the slider 0.025 inches. Motion of the slider is limited in both directions by limit switches 136 and 138 mounted on the slide guide 131. The slide block 126, which is detailed into slots on slide base 130, supports the piston rod 134. A lock screw 132 holds the shaft (piston rod 134) to the slide block 126. Block 128 is a square block with a threaded hole matching the threads on micrometes screw 118. Block 128 allows for any eccentricity in micrometer screw 118 and prevents this eccentric motion from being transmitted to the piston which might result in a pulsating output, a detriment to good calibration.

Figure 4:
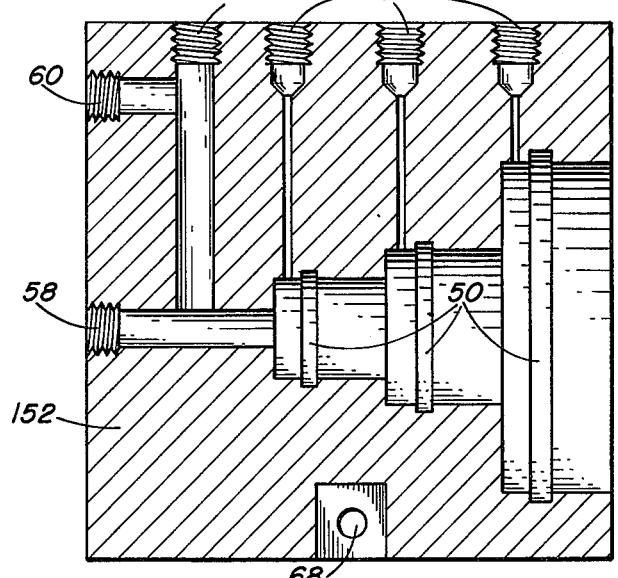
FIG. 4 is a cut-away view of the outlet block of FIGS. 1 and 2.

The tube assembly is made up of a conical tube support 122, the fluid impermeable precision bored glass tube 150, the piston 142, and the outlet block 152. The piston, moving at a constant rate along the tube, discharges the gas or fluid through the outlet block. The precision bored tube is sealed in the outlet block by means of an "O"-ring that is mounted in a groove in the outlet block. The outlet block is constructed to accept tubes having any one of three outer diameters. This is shown in FIG. 4.

The outlet block 152 supports several additional components. The bleeder valves 154 are used to vent air from the system when liquid calibration is to be accomplished. The pressure valve 156 is provided to facilitate the measurement of outlet flow pressure. The temperature probe 158 is used for determining fluid outlet temperatures. Solenoid 160 is a three-way solenoid valve which is mounted on the outlet block through heat sink 162 and two nipples 170. Solenoid valve 160 is electrically connected to the motor and solenoid valve control unit 226 via electrical cable 172 as shown more clearly in the electrical circuit of FIG. 5. When the piston is moving forward, the solenoid valve is deactivated and opens the discharge port of the solenoid, thereby allowing the medium to flow from the outlet block to the meter port 174. When the drive is in reverse, the solenoid valve is activated and activates opening the top port 176 and allows the medium to be drawn from top port 176 into the tube 150. For liquid calibration, the reservoir 178 is mounted on top port 176 through a nipple 182. During fluid calibration, the discharge from the instrument being calibrated, which is attached to port 174, is normally returned to the reservoir through elbow pipe and hose 180 insuring a constant volume for refilling the tube on the reverse stroke of the motor driven piston.

There are two basic arrangements available on this embodiment for measuring the outlet flow rate of the calibrator. The tube support 120 122 house a light source and photocell arrangement triggered by the holes 148 in the opaque piston rod 134. The holes are located in relationship to the first hole so that nominal volumes will result. The photocell and counter control unit 204 is located on the tube storage rack cover 184. This package consist of a power switch 214 (S-3), a command switch 208 (S-2), and start and stop electrical outputs, 210 and 212 respectively. Electrical cable 218 connects the photocell detection unit housed in tube supports 120, 122 with the photocell and counter control unit 204. A schematic of the photocell and counter control unit 204 is displayed in FIG. 7.

The second method for flow rate measurement consists of a 72 pulse per revolution toothed gear light wheel 220 mounted on the drive motor 110. This light wheel due to the teeth thereon pulses a light source-photocell unit 224 which plugs into an external counter via jack 222. By correct setting of the counter gate time, flow rate may be read directly on the counter. A fast reverse switch on the motor and solenoid valve control unit allows for a fast reverse without disturbing the potentiometer settings.

Motor and solenoid valve control unit 226 is stored during idle times and for portability on base 100 behind slide guide 131. Tubes and piston rods are stored in supports 30 and 40, and piston assemblies and the reservoir are stored on tube storage rack cover 184 (FIG. 2). Attached at each end of base 100 are handles 106. These handles are secured to base 100 by supports 108 and screws 109.

Generally, the total system is transported to any location for calibration as required. In order to set up the system, the carrying handles 106 are pivoted around screws 109 to the down position as shown in FIGS. 1 and 2. The plastic dust cover 102 is removed by opening securing latches 104. The motor and solenoid valve control unit 226 is removed from storaged position on base 100 and located conveniently to the calibrating system. Power is supplied to drive motor 110 and counter control unit 204 by power cords 228 and 216 respectively. Tube storage cover 184 is removed by means of the two wing nuts 186 and 188. Selection is made of the precision bored tube, piston rod, and piston assembly desired for the calibration range required.

In the present embodiment three tubes, piston rod and piston assembly combination results in the following nominal flow ranges:

| Nominal Tube in Interior Diameter | Nominal Flow Ranges in cc/min |
|---|---|
| ½ inch | 0.0012 to 25 |
| ¾ inch | 0.02 to 50 |
| 1¾ inch | 0.1 to 280 |

The storage rack is shown in detail in FIG. 3. Secured to base 100 are supports 30 and 40. Mounted in the top of the support are threaded bolts 37 and 47 to which wings nut 186 and 188 respectively are secured. The ½ inch diameter tube is stored in slots 33 and 43, the ¾ inch diameter tube in slots 32 and 42, and the 1¾ inch diameter tube in slots 31 and 41. The respective piston rods are stored in slots 34 and 44, 35 and 45, and 36 and 46. The piston rods are secured in place by strap 38. The piston assembly for the ¾ inch diameter tube comprises piston 142, teflon cup seal 144, and retainer 146 secured to one end of piston rod 134. Pistons 192 and 198, teflon cup seals 194 and 200, and retainers 196 and 202 of the 1¾ inch and ½ inch tube, respectively, are secured to storage rack cover 184 by bolts 190.

Once the desired range of flow rates is determined, the proper diameter tube and corresponding piston rod and piston assembly are selected. As shown in FIG. 1, one end of piston rod 134 is inserted into slide block 126 and secured by retainer pin 132. The other end, with the piston assembly attached thereto, is inserted through support 120. In order to install the glass tube 150, outlet block 152 has to be moved to the extreme end of slide guide 166. This is accomplished by loosening lock screw 168. One end of the tube is mounted on the conical tube support 122 and the other end is inserted into outlet block 152. The block is moved to the left until the tube end is held securely between the block and the conical tube support. Then lock screw 168 is tightened and the installation of the tube, piston rod, and piston assembly is completed.

Referring now to FIG. 4, the outlet block 152 contains three major bores for receiving one end of the three different size precision bored tubes. Each bore has an "O" ring 50 to receive and secure the respective tubes. For each size of tube there is a respective bleeder port 54. In the common passage of the block is a port 58 to which a temperature sensor is inserted and a port 56 to which a pressure sensor value 156 is inserted. The outlet port 60 is mounted the solenoid valve. A lock screw 168 is received by hole 68.

Figure 5:
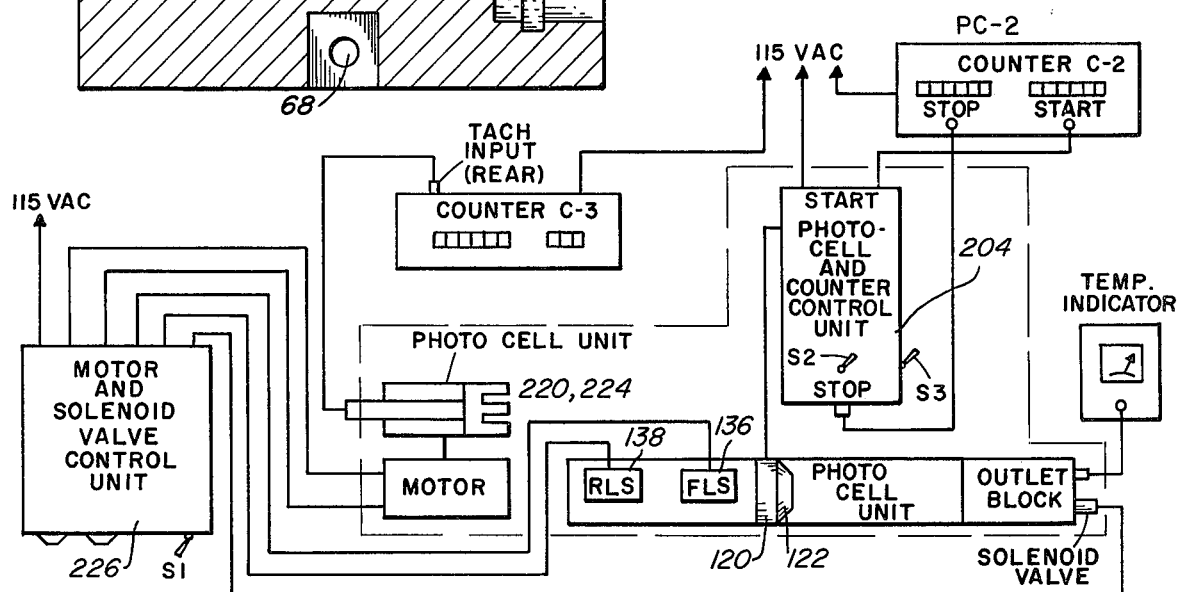
FIG. 5 is an electrical block diagram of the preferred embodiment.

The innerconnection of the electrical equipment is shown in FIG. 5. The numbers used refer to those used in FIGS. 1 and 2. Motor and solenoid valve control unit having forward and reverse switch S-1, potentiometer for variable speed, and servo control is connected to the motor 110 and solenoid valve 160. Reverse limit switch RLS and forward limit switch FLS, 138 and 136 respectively, are also connected to motor and solenoid valve control unit 226. Photocell unit PC-3, jack 222, which detects the rotation of motor 110 is connected to its respective counter C-3 through a tach input. The outher photocell unit PC-2, which is housed in supports 120, 122 is connected to photocell and counter control unit 204. This unit has a power switch S-3 and a start-stop switch S-2. The start and stop outputs are connected to the respective start and stop inputs of its corresponding counter C-2. Besides the solenoid valve 160 in outlet block, there is also a connection to a temperature indicator 158.

Figure 7:
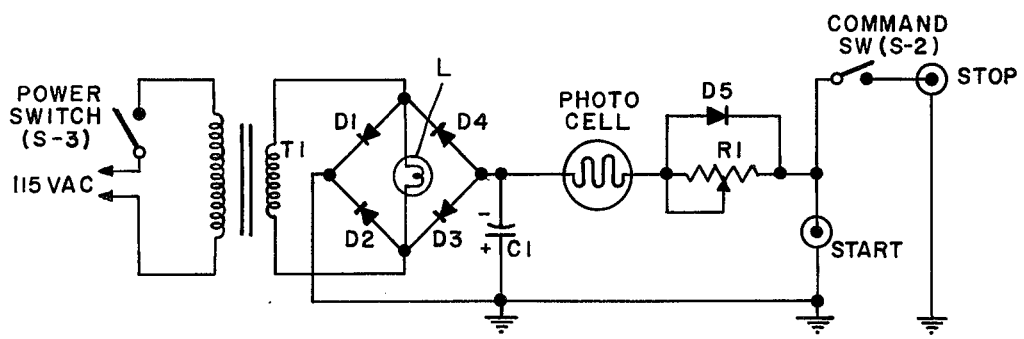
FIG. 7 is an electrical schematic of the photocell and counter control switch.

A detailed schematic of the photocell and counter control unit 204 is shown in FIG. 7. The power from a conventional power outlet is fed through power switch S-3 to transformer T-1. There the power is rectified in a full wave rectifier bridge comprising diodes D-1 through D-4. Attached across this bridge is a light source "lamp" L. Capacitor C-1 is connected across the output of the rectifing bridge. Initially capacitor C-1 is charged up. When light from the lamp L shines on the photocell through holes in the piston rod 134, the photocell resistance is lowered and capacitor C-1 discharges and sends a pulse through the start output to the counter start mechanism. When command switch S-2 is closed and light again shines on the photocell, the capacitor is discharged through both the start and stop output to the start and stop mechanism of the counter, which will stop the counter. Variable resistor R-1 determines the amount of light needed to send the command pulses to the counter.

As indicated earlier, there are two possible ways of measuring the flow with the present invention. The first one is a volume/time measurement using counter C-2, photocell unit PC-2, and photocell counter control unit 204. Power switch S-3 is closed to activate photocell units PC-2 and switch S-1 of the motor and solenoid valve control unit 226 is put to the forward postion to start the motor and piston rod mechanism moving in the forward direction. Potentiometers, not shown, in the motor control and solenoid valve unit adjust the motor speed as required. When the fist hole 148 in the piston rod's shaft passes through the cone support 122, a signal is sent to start the counter PC-2, C-2. To clarify this system, the first hole in the rod generates a pulse which starts a counter counting time. The following holes represent volumes discharged as determined by the exact diameter of the tube and the distance the piston travels. For example the holes may be drilled to represent volumes of 25, 50, 75, 100 cubic centimeters. If you wish to discharge a volume of 75 cc's, after the 50 cc hole has passed the photocell, switch stop switch S2 to the stop position. As the 75 cc hole passes the photocell the counter will stop. The resulting counter time reading in minutes divided into 75 cc's will result in the flow rate in cc/min. The counter displays time in seconds. Fraction of seconds are determined by the position of the multiplier on the counter. The volume/time will be determined by the stop command. This command is initiated by switching the command switch S-2 to the stop position. The counter will stop on the next hole passing through the conical support. For example, if the 0.75 inch diameter tube and corresponding piston rod and piston assembly are being used, and the stop command was initiated prior to the hole mark "50" on the shaft, and the counter after stopping indicates 125.65, flow in cubic centimeter per second equals 50c.c/121.65 sec. × 60 sec./min.=24.661CC/MIN The distance between the start hole and each nominal volume hole is calculated to be correct for the tube it is to be used with and only this tube. Hole center distances are located and drilled to the nearest 10 thousandth of an inch.

The second measurement system is known as the light wheels/count flow measurement. For this system, the drive motor shaft is equipped with a 72 tooth gear which is used as an interrupter or light wheel 220. The gear teeth pass through photocell unit PC-3 which is mounted on the base 100. The signals from the photocells unit PC-3 are transmitted through jack 222 to counter C-3. As each tooth passes through the photocell assembly, it interrupts the light source resulting in a pulse signal to the counter. Each revolution of the drive motor results in 72 pulses. By correct determination of gate time for the counter for each tube 150, the flow rate may be read directly on the counter display. The counter gate decade setting is determined by dividing the cross-section area of the tube 150 in ($M^2$ by the constant 1133.858. To check the operation of this measurement system, the time gate is set to 83333 to indicate the RPMs of the motor directly. The counter gate operates at 60 pulses per time period and the motor gear has 72 teeth. Therefore, 60 pulses/sec/72 pulses/rev. = 0.83333 rev./sec. If the gate is set at this setting, the counter will read motor rpm directly. When the motor is driven forward at its maximum speed, the counter should read between 1710 and 1760 RPM. Also by using both volume/time flow rate measuring systems simultaneously, it is possible to cross check the operation of one method versus the other.

The calibration of a flowmeter using a gas medium is accomplished as follows. A check is made to ensure that all three bleeder valves 154 on outlet block 152 are tightly closed. The "gaseous fluid" or gas is pulled into the cylinder 150 as the piston and seal (142, 144) is traveling on its reverse travel. Gas enters thru the top port 176 of solenoid valve 160. The three bleed valves 154 are used only when charging the system for liquid calibration.

There are three bleed valves 154—one for each size tube as shown in FIG. 4. As stated above, they are used only when doing liquid calibrations. To clarify the entire liquid calibration operation the arrangement and filling process will be described below. A suitable pressure gauge is connected to outlet block 152 at 156. The instrument to be tested is connected to solenoid valve 160 which is attached to output block through heating sink 162 and two nipples 170. The calibration system is initiated as described above and the flow rate is measured with the time/volume or light wheel/counter arrangements. Pressure and temperature are observed and recorded as well as the flow rate. A switch is provided on the motor and solenoid valve control unit for a fast reverse which is accomplished without moving the speed control potentiometer. The test may be repeated as many times as required with relative ease.

For liquid flow calibration, the arrangement of the equipment is similar to that for the gas flow calibration. To arrange for liquid calibration, reservoir 178 is removed from its position shown in FIG. 1–2 and screwed into top port 176 of solenoid valve 160 by means of nipple 182 screwed into bottom of reservoir 178. (See FIG. 2). Top port 176 is vented to the glass tube 150 when piston 142 is traveling in the reverse direction. When piston 142 is traveling in the forward direction (toward end block 152), top port 176 is closed and liquid is discharged through meter port 174.

To complete connections prior to filling and calibration, flexible tubing is connected from meter port 174 to the inlet of the flowmeter to be calibrated and from the outlet of the flowmeter to be calibrated to elbow pipe 180 at the top of reservoir 178. The motor is switched to the forward position and the piston 142 is then driven all the way forward and reservoir 178 is filled up to the top port 176 with the liquid to be used for calibration.

The motor is then placed in the reverse position and the piston is driven in the reverse direction, liquid is pulled from the reservoir through top port 176, nipples 170 and heat sink 162 into the end block 152 and tube 150. When the piston is in the full reverse position (towards conical tube support 122), a small amount of air is still entrapped in the system. To extract this air, the entire discharge end of the invention is elevated by use of handle 108, the appropriate bleed valve 154 for the size tube being used is opened, capped pressure port 156 is loosened, and the piston driven in the forward position. By pinching the tubing connected to meter port 174, the air is forced out of bleed valve 154. When all air is expelled, the bleed valve is closed and tubing unpinched and the cap tightened. Metered outlet flow is now discharged from meter port 174 thru the flowmeter to be calibrated and back into reservoir 178 on the forward stroke and from reservoir 178 thru top port 176 into the end block 152 and tube 150 on the reverse stroke. Other than these initial steps, the calibration process is the same as described for the gas calibration.

Figure 6:
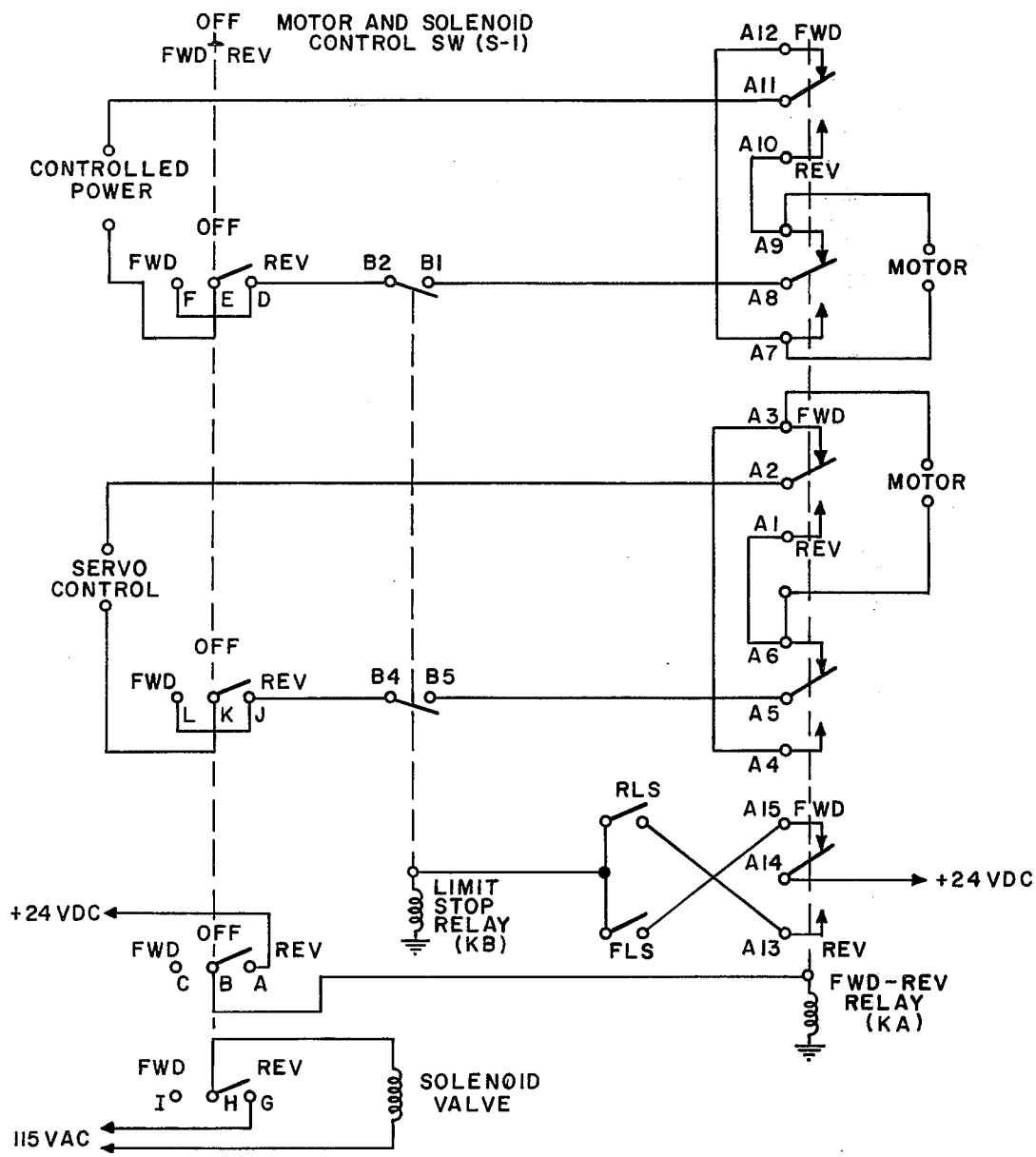
FIG. 6 is an electrical schematic of the motor and solenoid valve control switch.

Referring now to FIG. 6, the relationship between the three-way solenoid valve 160, the motor and solenoid valve control S-1 switch, and the limit switches is depicted therein. Motor and solenoid valve control switch S-1 of unit 126 has three positions, i.e. forward, reverse, and off. The switch is shown schematically as having four arms. The solenoid valve 160 is connected to a conventional power source when the switch S-1 is in the reverse direction. This is shown when contacts H and G are bridged. When this occurs, the solenoid connects the valve 160 from the outlet block 152 to the reservoir port 176. In the off or forward direction the solenoid connects the valve from the outlet block to port 174, which is connected to the meter to be tested. When switch S-1 is in the reverse direction contact B is connected to contact A and connects a 24 volt DC source to forward and reverse relay KA. When switch S-1 is in the off or forward direction, the relay KA is de-energized. When switch S-1 is in the forward or reverse direction signals from the motor are fed back to a servo control through contact K and J or K and L respectively. Similarly swithc S-1 is in the forward or reverse direction, controlled power is applied to the motor through switch contact E and D or E and F respectively.

Forward and reverse relay KA controls contacts A-1 through A-15. Contacts A-7 through A-12 apply controlled power to the motor in the correct polarity and contacts A-1 through A-6 feed back, to the servo control, signals from the motor in the correct polarity. Contacts A-13 through A-15 connect a D.C. source to limit stop relay KB through limit switches RLS and FLS. Limit stop switch KB has contacts B-1 and B-2 connecting the motor and the controlled power, and contacts B-4 and B-5 connecting the motor feedback and the servo control. When switch S-1 is in reverse direction and contacts A and B are connected, forward and reverse relay KA is activated. This connects A-14 to A-13 and applies power to one side of the reverse limit switch RLS. When the slide block comes to its furtherest extreme the reverse limit switch RLS is closed which applies the D.C. power to limit stop switch relay KB which opens contacts B-1, B-2, B-4, B-5 and cuts off the power to the motor and the feedback signal to the servo control. The same would be true if switch S-1 was in the forward direction, since relay KA is deactivated and forward limit switch FLS would close to activate limit stop relay KB again. Thus the motor control is automatically shut down when slide block 126 reaches either extreme.

Even though this is a flowmeter calibrator, the device may also be used to calibrate volume meters, i.e. meters which measure the total amount of flow rather than its rate. This is possible because the holes in the piston rod are marked with volume indicators for a given precision bored tube. Using the temperature sensor and pressure sensor, correction of the actual volume can be made. Obviously many modifications and variations of the present invention are possible in light of the above teachings. It is therefore to be understood that, within the scope of the appended claims, the invention may be practiced otherwise than as specifically described.

What is claimed is:

1. Calibration apparatus comprising:

a base a fluid impervious precision bore tube having a known inner diameter mounted on said base, said tube being adapted to contain a fluid;

a piston disposed within said tube and movable to force fluid out of said tube;

a piston rod having one end connected to said piston;

a micrometer screw rotatably mounted on said base;

a slider block slidably engaging said base and mounted on said screw and connected to the other end of said piston rod;

means for preventing rotation of said slider block whereby each revolution of said screw moves slider block a known linear distance;

a motor connected to said screw for rotating said screw at a preset velocity and thereby causing said slider block and said piston to move linearly at a constant velocity; and means operatively cooperating with the piston rod movement for measuring the velocity of said piston and thereby the flow rate of the fluid being forced out of said tube.

2. The calibration apparatus of claim 1 further comprising:

an outlet block having a passage through it mounted on said base, one end of said passage being connected to said tube for receiving fluid therefrom;

a three port solenoid valve having a first port connected to the other end of said passage; and control means for starting, stopping and determining the direction and speed of the motor, and opening and closing said solenoid valve.

3. The calibration apparatus of claim 2, wherein said motor is reversible, and further including a reservoir adapted to be connected to a second port of said valve, and wherein the third port of said valve is an outlet port adapted to be connected to a meter to be tested, and control means connecting said first and third ports for the forward direction of said motor, and said first and second ports for the reverse direction of said motor.

4. The calibration apparatus of claim 3 wherein said outlet block further includes means for measuring the temperature and pressure of the fluid in said passage.

5. The calibration apparatus of claim 4 wherein the passage in said outlet block includes a plurality of bores, axially aligned and forming a portion of said passage, each bore having a different diameter, said bores being arranged according to the size of their diameters in descending order one after the other, the largest diameter bore being at one end of the passage, whereby tubes having different outer diameters may be connected to said outlet block.

6. The calibration apparatus of claim 1 wherein the piston velocity measuring means comprises:

a toothed light wheel mounted on and rotated by said motor at a constant rpm indicative of the velocity of the piston;

a light source for producing radiation positioned on one side of said light wheel;

a photocell assembly positioned on the other side of said light wheel for receiving radiation from said light source and generating electrical signals for each revolution of the light wheel in response to changes in the intensity of radiation due to the passing teeth of said toothed wheel; and variable time base counter means connected to said photocell assembly for receiving said electrical signals and thereby measuring the rpm of the light wheel, the velocity of the piston, and the flow rate of the fluid being forced from said tube;

said counter means having a counter gate decade setting determined by dividing the cross-section area of said tube in $CM^2$ by the constant 1133.858

7. The calibration apparatus of claim 1 wherein the piston velocity measuring means comprises:

a light source positioned on one side of said piston rod for producing radiation;

photocell assembly means positioned on the other side of said piston rod for receiving and detecting changes in the intensity of the radiation and generating electrical signals in response thereto;

means on said piston rod for intermittently changing the intensity of said radiation and causing the generation of a known number of electrical signals when the rod has moved a known distance; and means connected to said photocell assembly means for receiving the electrical signals and measuring the time it takes the piston rod to travel the known distance and thereby the velocity of the piston and the rate of flow of fluid being forced from the tube.

8. Flowmeter calibration apparatus comprising:

a slide base;

a fluid impermeable precision bore tube having a known inner diameter mounted on said base, said tube being adapted to contain a fluid;

a piston disposed within said tube for expelling said fluid therefrom;

a rod for driving said piston, said rod having accurately drilled and spaced holes along the length thereof;

means connected to said rod for precisely moving said piston linearly along the length of the tube to cause the fluid in said tube to flow out of the tube at a constant rate;

a meter port connected to said tube for receiving the flow of fluid therefrom and transferring the fluid to a meter which is to be calibrated;

a light source on one side of said rod;

a light detector on the other side of said rod aligned to receive light from said source through said holes and for detecting changes in the intensity of the received light, and means coupled to said light detector for generating electrical signals in response to the detected changes in the intensity of the received light which passes through said rod; and means responsive to said electrical signals for measuring the time between the generated signals for ascertaining the rate of movement of said piston and the rate of flow of fluid out of said tube.

9. The apparatus of claim 8 wherein said means for moving said rod is a motor, and said light detector is a photocell assembly, and said tube is transparent.

10. The device of claim 8 wherein the means for measuring the time between the generated electrical signals comprises:

an elapsed time counter connected to said photocell assembly; and counter control means connected between said photocell assembly and said elapsed time counter for starting the elapsed time counter upon the occurrence of the first generated electrical signal and for stopping the counter upon the occurrence of the second generated electrical signal.

11. Flowmeter calibration apparatus according to claim 8, wherein there is provided an outlet block and a solenoid valve between one end of said tube and said meter port, a control unit for said motor and said solenoid valve, and electrical connections from said control unit to said motor and said valve, whereby movement of said piston is correlated with selective control of said valve by the control unit.

* * * * *